United States Patent
Weger

(10) Patent No.: US 7,554,219 B2
(45) Date of Patent: Jun. 30, 2009

(54) DC/DC CONVERTER HAVING AN INPUT SWITCHING STAGE AND A PLURALITY OF OUTPUT CHANNELS

(75) Inventor: Robert Weger, Wels (AT)

(73) Assignee: Minebea Co., Ltd., Nagano-ken (JP)

(*) Notice: Subject to any disclaimer, the term of this patent is extended or adjusted under 35 U.S.C. 154(b) by 18 days.

(21) Appl. No.: 11/259,137

(22) Filed: Oct. 27, 2005

(65) Prior Publication Data
US 2006/0087869 A1 Apr. 27, 2006

(51) Int. Cl.
*H02J 1/04* (2006.01)
*G05F 5/00* (2006.01)
(52) U.S. Cl. ......................... 307/35; 323/299
(58) Field of Classification Search .............. 307/35; 323/234, 299
See application file for complete search history.

(56) References Cited
U.S. PATENT DOCUMENTS

| | | | | |
|---|---|---|---|---|
| 5,845,190 A | * | 12/1998 | Bushue et al. | 725/130 |
| 5,920,466 A | * | 7/1999 | Hirahara | 363/21.02 |
| 6,118,676 A | * | 9/2000 | Divan et al. | 363/34 |
| 6,369,525 B1 | | 4/2002 | Chang et al. | |
| 6,525,434 B2 | | 2/2003 | Brodeur | |
| 2002/0070914 A1 | * | 6/2002 | Bruning et al. | 345/102 |
| 2003/0063299 A1 | * | 4/2003 | Cowan et al. | 358/1.9 |

FOREIGN PATENT DOCUMENTS

DE 102 60 246 A1 7/2004
WO WO 2004/100346 A1 5/2004

OTHER PUBLICATIONS

Arian Jansen et al., "High Power Density at High Power Levels," Proceedings CIPS 2002, Jun. 11-12, 2002, Bremen, Germany, pp. 59-63.

\* cited by examiner

*Primary Examiner*—Albert W Paladini
*Assistant Examiner*—Dru M Parries
(74) *Attorney, Agent, or Firm*—Duane Morris LLP

(57) ABSTRACT

A DC/DC converter having an input switching stage on the primary side and a plurality of output channels on the secondary side of the converter, each output channel having a secondary control loop and a monitoring device, the monitoring devices monitoring the operation of the secondary control loops, and a primary control loop being provided on the primary side which receives output signals from the monitoring devices and drives the input switching stage according to the output signals.

15 Claims, 3 Drawing Sheets

Figure 1:
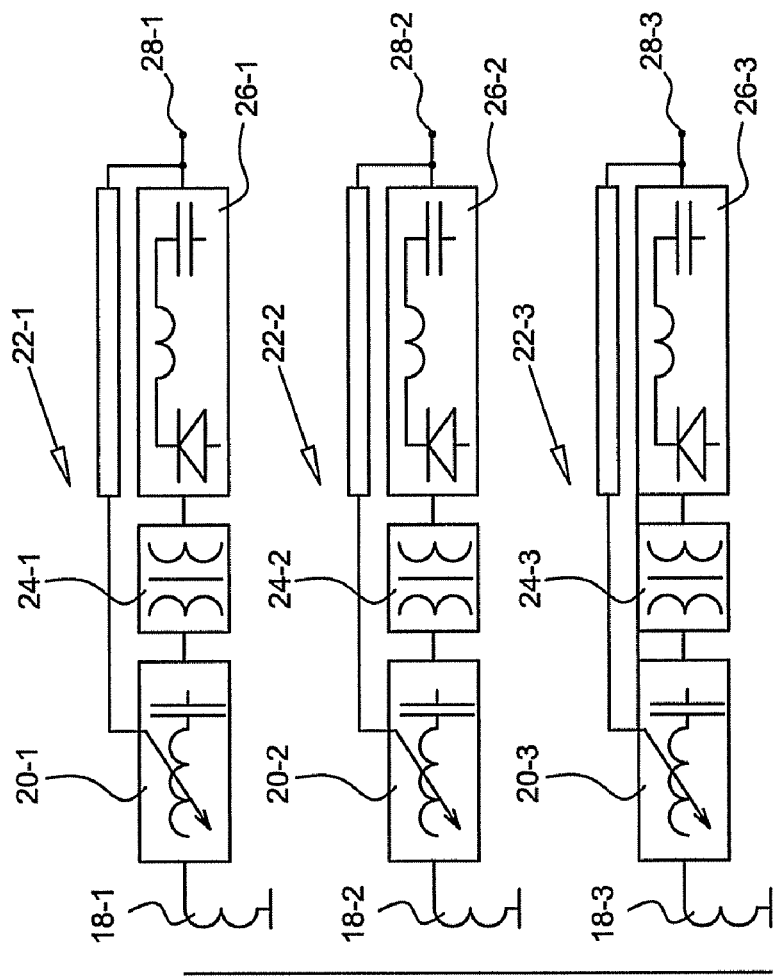
Figure 1:
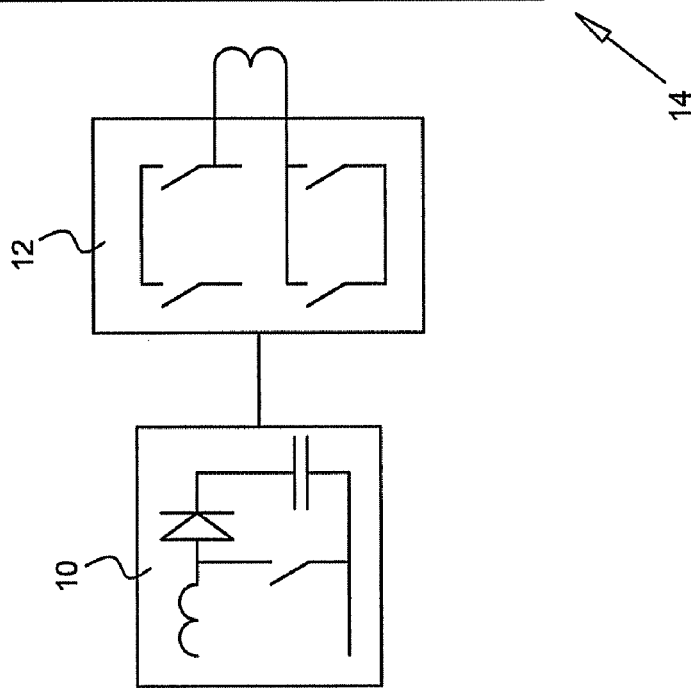

DC/DC CONVERTER HAVING AN INPUT SWITCHING STAGE AND A PLURALITY OF OUTPUT CHANNELS

The instant disclosure claims the filing-date benefit of German Patent Application No. 103 21 234.5 filed May 12, 2003, and the PCT Application No. PCT/EP04/004681, filed May 3, 2004, the specification of each application is incorporated herein in its entirety.

FIELD OF THE INVENTION

The invention relates to a DC/DC converter having an input switching stage on a primary side and a plurality of output channels on a secondary side of the converter. Each output channel preferably generates a different output voltage.

BACKGROUND OF THE INVENTION

A DC/DC converter generates an output DC voltage (one channel converter) or several output DC voltages (multi-channel converter) from an input DC voltage. The general criteria governing the quality of these kinds of converters mainly include their conversion efficiency, the stability of the output voltages and the suppression of high-frequency disturbances. DC/DC converters have a wide range of applications, such as their use in switch mode power supplies.

Multi-channel converters are mostly used in power supplies for computer systems, in particular. In these applications, a power factor controller (PFC) generates an intermediate circuit DC voltage of approx. 400 volts from the mains AC voltage. From this, a downstream multi-channel DC/DC converter generates output voltages of typically 12 volts, 5 volts and 3.3 volts.

The controller in DC/DC converters has the task of keeping its output voltages constant at defined target values despite changing load conditions at the outputs and a possibly erratic input voltage.

The input switching stage of a DC/DC converter generally comprises a pulse width modulator for the purpose of adjusting the power available on the primary side.

As long as only one single output voltage is required (one channel converter), the pulse width of the input switching stage—triggered by a deviation in the actual value of the output voltage from the target value—is changed (e.g. an output voltage smaller than the target value initiates an increase in the pulse width etc.). Depending on the special requirements of the application, different control characteristics can be applied (PI, PID, etc.).

As soon as several output voltages are derived from one input switching stage, it is basically possible to regulate an output voltage in a main output channel, as described above, by controlling the input switching stage (primary control) and to provide a secondary regulation loop for the other output voltages. The problem with this control strategy is that when there is little load at the main output channel, the pulse width on the primary side is narrow and all other channels are likewise limited to a low power consumption.

This method can be especially applied when, owing to the application, one output channel is permanently under a heavier load than all the other channels.

Where this is not a prerequisite of the application, it is preferable if a fixed primary pulse width is chosen und each output channel is regulated by a separate secondary regulation loop. The fixed primary pulse width has to be large enough to provide sufficient power even when there is maximum load.

FIG. 1 shows a block diagram of a power supply of this kind having secondary control loops that are designed as dynamic resonance control loops.

On the input side of the power supply, an upstream PFC 10 converts an input AC voltage into a primary DC voltage that supplies the input switching stage of the multi-channel-DC/DC converter. Variable resonance circuits operate as power throttling elements in the AC voltage region of each output channel. Connected to these are matching transformers and output rectifier networks. The circuit shown in FIG. 1 is published in: "High Power Densities at High Power Levels" by A. Jansen et al. In CIPS 2002, $2^{nd}$ International Conference on Integrated Power Systems, 11.-12. Jun. 2002, Bremen, DE.

In FIG. 1, the DC input voltage is fed via a full bridge 12 into the primary winding 16 of a main transformer 14. The full bridge 12 switches at a fixed frequency of 700 kHz for example, preferably in ZVS operation (zero-voltage switching). The main transformer 14 delivers identical output voltages to three secondary output windings 18-1, 18-2, 18-3. These are fed via variable impedances 20-1, 20-2, 20-3 and matching transformers 24-1, 24-2, 24-3 into associated rectifier networks 26-1, 26-2, 26-3. The secondary regulation loops are schematically indicated at 22-1, 22-2, 22-3. The variable impedances 20-1, 20-2, 20-3 can be adjusted via controlling currents and connected in series with capacitors. The capacitors ensure that only very low impedance values can be achieved in the vicinity of the resonance of the LC components. The variable impedances 20-1, 20-2, 20-3 can be realized, for example, by a variable inductor, a variable capacitor or an oscillating circuit having a variable resonance frequency or a variable ohmic resistor. A suitable coil arrangement having variable inductance is described, for example, in German Patent Application No. 102 60 246.8 dated 20 Dec. 2002.

FIG. 1 shows a method known in the prior art of controlling a DC/DC converter having a plurality of output channels. The primary side of the main transformer 14 is driven by a fixed pulse width that is large enough to ensure sufficient power output even under maximum load. The secondary output channels are then regulated according to the actual existing load. This control method has the disadvantage that a high reactive power always circulates in the input switching stage. The reactive currents cause energy losses at the ohmic resistors in the input circuit (switching elements, primary winding, strip conductors, input capacitor). In a part-load situation, this goes to reduce the efficiency of the DC/DC converter and, in no-load operation, it results in unnecessarily high energy consumption.

The object of the invention is to provide a DC/DC converter having an input switching stage and a plurality of output channels that operates with optimum efficiency under all load conditions.

SUMMARY OF THE INVENTION

This object has been achieved by a DC/DC converter having the characteristics of patent claim 1.

According to the invention, each output channel has a secondary control loop and a monitoring device. The monitoring device measures whether its associated channel is approaching an overload situation and generates an appropriate signal. A primary control loop is additionally provided which receives the output signals from the monitoring devices and regulates the power of the input channel according to these output signals. The primary control loop particularly measures when at least one of the channels approaches its overload status and drives the primary side of the DC/DC converter accordingly in order to provide higher input power. A pulse width modulator is used on the primary side of the DC/DC converter to control the input power. The invention makes it possible for the pulse width set on the primary side to be as large as necessary, but no larger. This goes to minimize losses that occur at the ohmic resistors of the primary circuit due to reactive currents in the primary circuit (called losses of the second order).

In a preferred embodiment of the invention, each output channel has a power valve that forms a part of the secondary control loop and is used to adjust the output power. The power valve is preferably realized by a variable inductor but could also be formed from an adjustable capacitor or an adjustable resistor.

Figure 2:
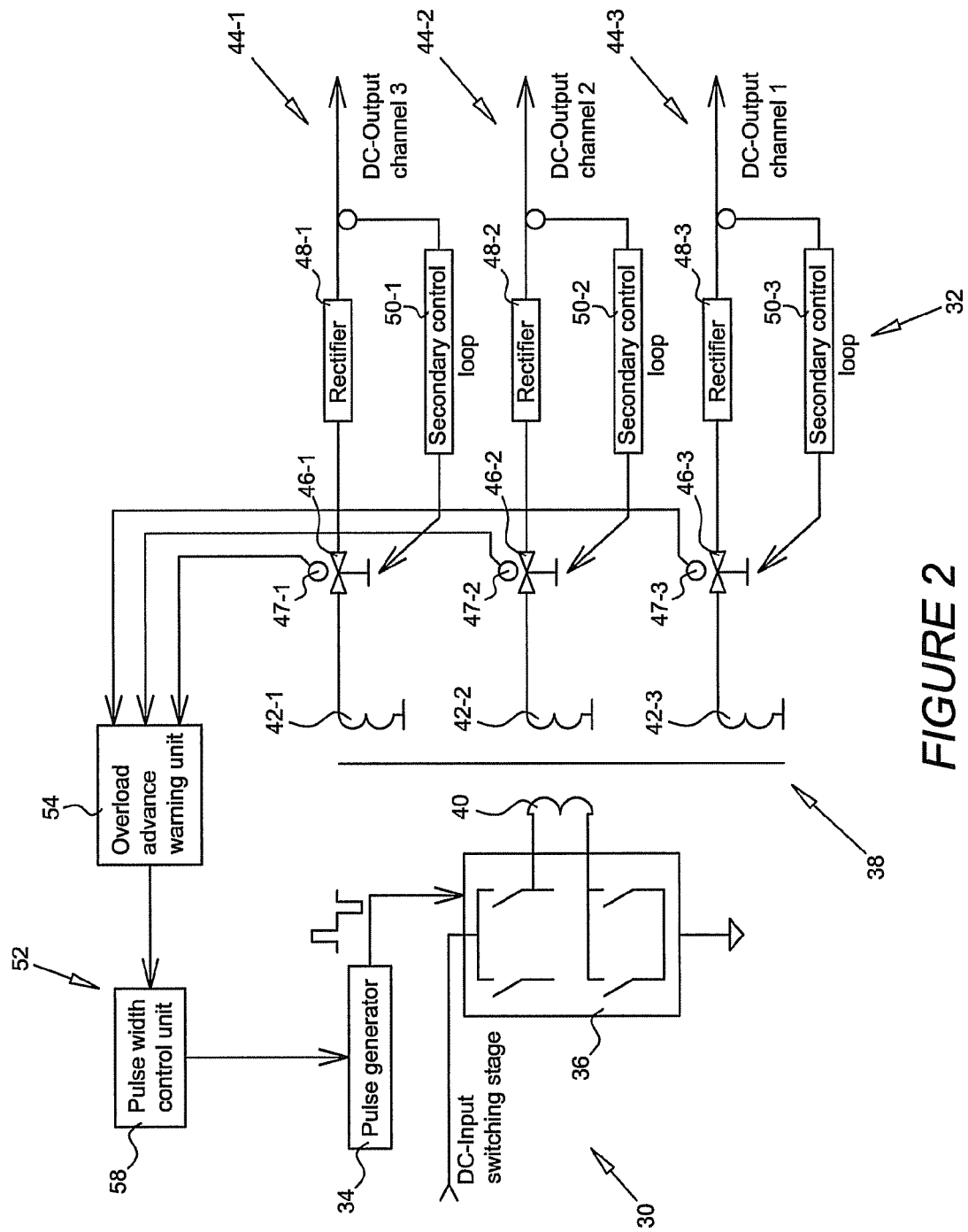

In other words, the invention eliminates the disadvantage of poor efficiency in the part-load range in that the pulse width of the input switching stage is regulated according to the overall load. That means, the pulse width is only kept just large enough to meet the actual overall load. The information on when the pulse width is just large enough is obtained according to the invention by monitoring the elements throttling the secondary power flow. These could include, for example, variable inductors, variable capacitors, transductors, dynamic resonance circuits or even transistors. They act, at any rate, like controllable valves for the secondary power flow and are indicated in FIG. 2 by the general symbol for a valve. The decisive characteristic for these elements is to have the minimum impedance possible for the specific application or, expressed in other terms, the maximum possible degree of opening for the flow of power. If the impedance adjusted through the secondary regulation loop approaches the possible minimum, this is an indication that the channel concerned is approaching the end of its control range and the input switching stage should increase the pulse width so that, should the load increase even further, the end of the secondary control range is not reached. The proximity to minimum impedance can generally be recognized by the control variable of the throttling element (e.g. bias current for a transductor, base current for a transistor, . . . ).

To monitor the output power of the output channels, each output channel preferably has an overload detector that monitors whether the channel is approaching an overload situation and generates appropriate signals. In an advantageous embodiment, the overload detector is coupled to the power valve and particularly measures a control variable of the power valve that is dependent on the output power required at the output channel.

In an advantageous embodiment of the invention, the monitoring devices pass on their output signals to an overload advance warning unit, which determines whether any output channel is approaching its maximum load. Depending on the result of this check, the overload advance warning unit uses the associated output signal to regulate the power of the input channel and particularly to adjust the pulse width of a pulse width modulator of an input channel.

The proximity to the end of the control range is recognized by the overload advance warning unit and a pulse width control unit orders an increase in the pulse width. The pulse width control unit reacts to this command by increasing the pulse width in the pulse width modulator. This change should not be abrupt, but must be made according to a defined rate of increase. As soon as the signal from the advance warning unit expires, the pulse width control unit decreases the pulse width at a defined rate of decrease. The rates of change have to be small enough so that the secondary control loops can properly correct the disturbances caused by the change in the pulse width. The rate of decrease is relatively unproblematic since it only determines how quickly optimum efficiency is reached after a fall in load. Times of 10 to 100 milliseconds are perfectly sufficient in general. It is easy for the secondary controller to correct these slow changes. The rate of increase, however, has to be made as high as possible so that after abrupt increases in load no voltage drop occurs at the channel under load. The limit for the permitted rate of increase is set, in turn, by the ability of the secondary controller to correct the disturbance.

In an advantageous embodiment of the invention, it is finally provided that the pulse width control unit sets an upper and a lower limit for the pulse width of the pulse width modulator. An upper limit for the pulse widths of the pulse width modulator, or more generally, for the input power, is important to ensure that the DC/DC converter operates within safe operating limits. A lower limit that sets a minimum pulse width is necessary to ensure that the DC/DC converter can still be safely operated in an operating mode having zero-voltage switching (ZVS) even when no power is consumed. In particular, the current has to be large enough to ensure a sufficiently rapid charge reversal of the parasitic switch capacitance. Moreover, the advance warning threshold for the overload status of each output channel should be established taking into account the size of the maximum permitted load steps. If large load steps are to be expected, the advance warning threshold has to be set lower to prevent the channel from reaching its overload limit when there is a large load step.

The described method makes it possible to improve the efficiency of DC/DC converters which derive several secondary regulated output voltages from one single input switching stage. The power throttling elements of each regulated output channel are monitored with respect to their degree of opening or their degree of control. As long as this degree of opening does not exceed a defined critical value for any of the elements (advance warning threshold), the pulse width of the input switching stage is steadily reduced. As soon as at least one element exceeds a critical value, the pulse width is steadily increased. This regulation ensures that the primary pulse width is always minimized for every output load configuration. This results in the bridge currents in the input circuit being minimized and the efficiency of the converter being maximized.

To ensure switching at zero crossing of the voltage at the switches (ZVS) even under low load and also to act as overload protection, the DC/DC converter according to the invention provides lower and upper limits for the pulse width on the primary side.

SHORT DESCRIPTION OF DRAWINGS

The invention is described in more detail below on the basis of preferred embodiments with reference to the drawings. The figures show:

FIG. 1 a block diagram of a switch mode power supply according to the prior art;

FIG. 2 a block diagram of the DC/DC converter according to the invention; and

Figure 3:
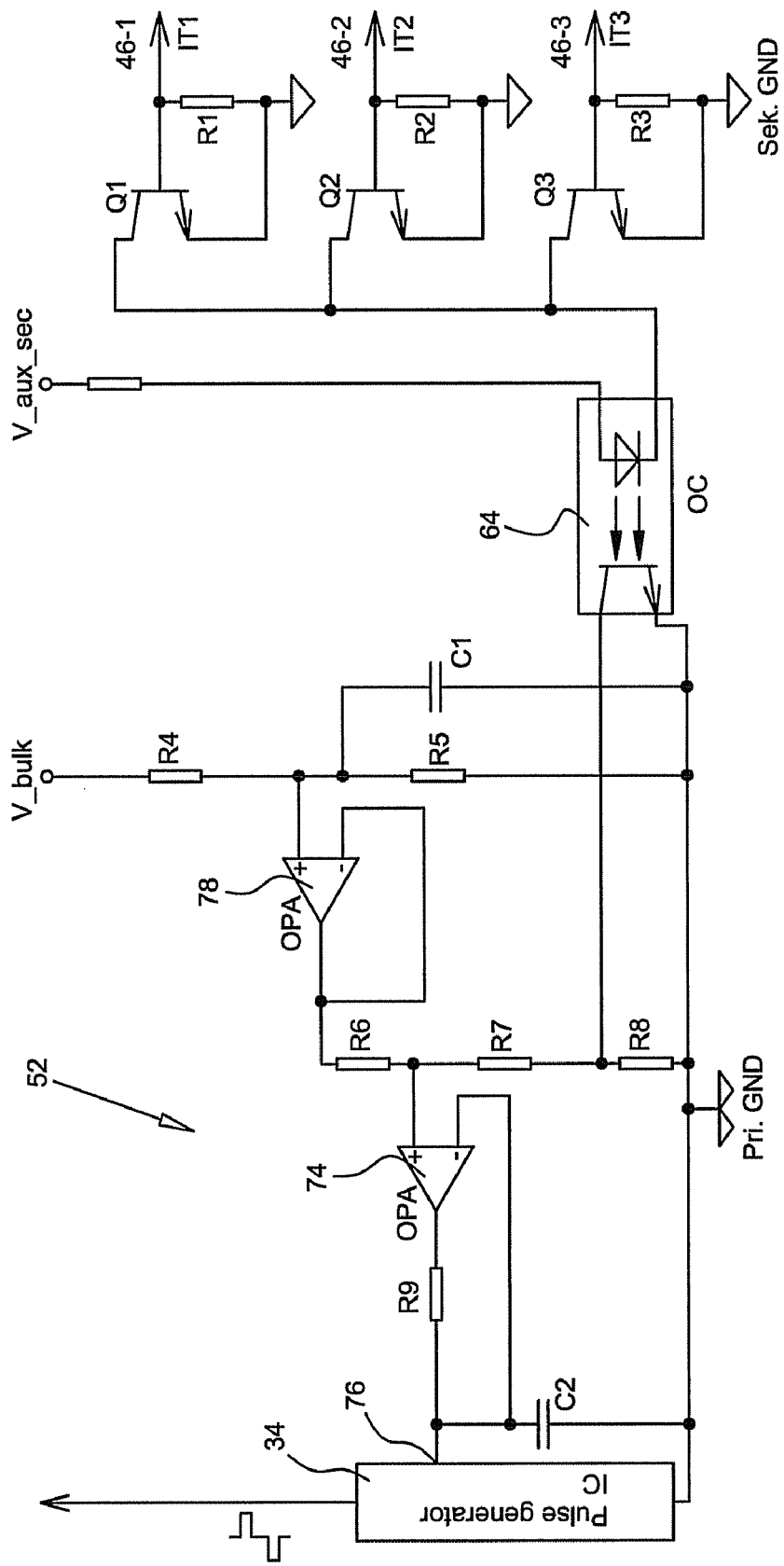

FIG. 3 a circuit diagram of a practical embodiment of the primary control loop for the DC/DC converter according to the invention.

DETAILED DESCRIPTION OF PREFERRED EMBODIMENTS

FIG. 2 shows a block diagram of the DC/DC converter according to the invention. The DC/DC converter comprises an input switching stage 30 on a primary side of the DC/DC converter and three output channels 32 on the secondary side of the DC/DC converter. A person skilled in the art would be aware that the invention could also be applied to DC/DC converters having fewer or more output channels than are shown in FIG. 2. The input switching stage 30 comprises a pulse width modulator 34, which can be realized through a pulse generator IC.

The output of the pulse width modulator 34 is connected to the input of a full bridge 36 that rectifies the output signal of the pulse width modulator 34. The construction and control of such full bridges is known in the prior art and described, for example, in German Patent Application No. 101 03 809.7 dated 29 Jan. 2001. The output of the bridges 36 is connected to a main transformer 38. The main transformer 38 has a primary winding 40 on the primary side and three identical secondary windings 42-1, 42-2 and 42-3 on the secondary side. A person skilled in the art would be aware that the secondary windings could also have different numbers of windings. For the sake of simplicity, however, it is assumed that all output channels on the secondary side of the main transformer 38 are constructed in the same way, as described in more detail below.

As in the embodiment of FIG. 1, the DC/DC converter has three output channels 44-1, 44-2 and 44-3 which are substantially identical in construction but deliver different voltages of, for example, +3.3 V, +5 V and +12 V.

Each output channel 44-1, 44-2 and 44-3 comprises a power valve 46-1, 46-2, 46-3 to adjust the output power emitted by the respective channel. This power valve can be formed by a variable inductor, a transductor, a variable capacitor, an LC component having an adjustable resonance frequency or also by an adjustable ohmic resistor, realized, for example, by means of a transistor. In a preferred embodiment, the power valve 46-1, 46-2, 46-3 is realized by an inductor regulated via a current as described, for example, in the above-mentioned German Patent Application No. 102 60 246.8. It should be noted that the power valves can be arranged both on the AC side as well as the DC side of the output channel.

Each output channel 44-1, 44-2, 44-3 further has a rectifier network 48-1, 48-2 or 48-3 that generates a rectified output voltage.

Finally, a secondary control loop 50-1, 50-2, 50-3 is provided in each output channel in order to regulate the output voltage of the respective channel to a constant value irrespective of the load. To this effect, the respective secondary control loops 50-1, 50-2 and 50-3 activate their associated power valves 46-1, 46-2 or 46-3.

To ensure that the DC/DC converter is supplied with sufficient power via the pulse width modulator 34 and to simultaneously keep the pulse width emitted by the pulse width modulator 34 as narrow as possible, the DC/DC converter according to the invention additionally has a primary control loop 52. The primary control loop 52 comprises an overload advance warning unit 54 and a pulse width control unit 58. The overload advance warning unit 54 measures the respective load situation of the output channels 44-1, 44-2, 44-3 by scanning the control variable, for example, the control current, of the power valves 46-1, 46-2 and 46-3. To this effect, monitoring devices 47-1, 47-2, 47-3 are provided which measure the control variable. The control variables are compared with predetermined threshold values in order to determine whether a critical value, which indicates that the respective channel is approaching its operating limit, has been exceeded. The overload advance warning unit 54 recognizes that an output channel is reaching the end of its control range when the corresponding control variable exceeds the critical value and sends an appropriate signal to the pulse width control unit 58 to increase the pulse width. The pulse width control unit 58 reacts to this command by emitting a corresponding signal to the pulse width modulator 34 to raise the pulse width.

The pulse width control unit 58 also sets limiting values for a maximum pulse width and a minimum pulse width to avoid overloading the DC/DC converter and to meet the requirements with respect to the zero-voltage switch (ZVS) even under low-load or no-load operation.

FIG. 3 shows an example of a circuit diagram for a possible embodiment of the primary control loop of the multi-channel-DC/DC converter according to the invention having secondary control loops realized by means of dynamic resonance control loops. In the illustrated embodiment, the pulse width modulator 34, also referred to as a pulse generator, has an analogue input with the following properties: the output pulse width is for voltages of under a maximum of 3.5 volts and decreases linearly as the voltage increases, being zero at 4.5 volts. The pulse width modulator 34 can be realized by a commercial pulse generator IC, there being a large number of pulse width ICs that have similar linear control inputs.

The primary control loop 52 receives the control currents IT1, IT2, IT3 of the power valves as input signals at 46-1, 46-2 and 46-3. These power valves, or power throttling elements, could be, for example, current-controlled resonance circuit inductors. The bias currents (control currents) IT1, IT2, IT3 of these resonance circuit inductors are led via current sensor resistors R1, R2 or R3 and activate associated transistors Q1, Q2 or Q3. By choosing appropriate resistors, individual threshold values to trigger an advance warning can be established. As soon as the control current is sufficiently large in any of the output channels, the associated transistor Q1, Q2, Q3 becomes conductive and activates an optocoupler, OC, 64 which changes the voltage ratio of a voltage divider consisting of the resistors R6, R7, R8. Through this, the optocoupler 64 changes the voltage fed to the analogue control input 76 of the pulse width modulator IC 34 via an operational amplifier (voltage follower; OPA) 74. By means of a resistor R9 and a capacitor C2, the rate of change for the change in pulse width can be specified.

The voltage divider R6, R7, R8 has the additional function of holding the control signal for the operational amplifier 74 within a desired window and ensures the above-mentioned maximum and minimum limits for the pulse widths. This voltage divider is mainly supplied through a constant voltage from an operational amplifier (OPB) 78. This constant voltage is derived via a voltage divider R4, R5 and a capacitor C1 from the input DC voltage $V_{BULK}$ of the DC/DC converter. This has the additional advantage that in the event of a fall in the input DC voltage $V_{BULK}$ of the DC/DC converter, the pulse width is still increased which goes to improve the power failure bridging time.

The primary control loop 52 comprises a section associated with the secondary side of the DC/DC converter (to the right of the optocoupler 64 in the drawing) and a section associated with the primary side. The section associated with the secondary side is connected to an auxiliary supply voltage $V_{IAUX/SEK}$ and the secondary ground SEK.GND. The section of the primary control loop 52 associated with the primary side is connected to the supply voltage $V_{BULK}$ and the primary ground PRI.GND.

The features revealed in the above description, the claims and the figures can be important for the realization of the invention in its various embodiments both individually and in any combination whatsoever.

IDENTIFICATION REFERENCE LIST

10 PFC
12 Full bridge
14 Main transformer
16 Primary winding
18-1, 18-2, 18-3 Secondary windings
20-1, 20-2, 20-3 Impedances
22-1, 22-2, 22-3 Secondary regulation loops
24-1, 24-2, 24-3 Matching transformers
26-1, 26-2, 26-3 Rectifier circuits
28-1, 28-2, 28-3 Output voltages
30 Input switching stage
32 Output channels
34 Pulse width modulator
36 Full bridge
38 Main transformer
40 Primary winding
42-1, 42-2, 42-3 Secondary windings
44-1, 44-2, 44-3 Output channels
46-1, 46-2, 46-3 Power valves
47-1, 47-2, 47-3 Monitoring devices
48-1, 48-2, 48-3 Rectifiers
50-1, 50-2, 50-3 Secondary control loops
52 Primary control loop
54 Overload advance warning unit
58 Pulse width control unit
R1, R2, R3 Current sensor resistors
Q1, Q2, Q3 Transistors
64 Optocoupler OC
R4, R5, R6,
R7, R8, R9 Resistors
74 Operational amplifier OPA
76 Pulse width pin
78 Operational amplifier OPB
C1, C2 Capacitors

The invention claimed is:

1. A DC/DC converter comprising:
   an input switching stage on the primary side and a plurality of output channels on the secondary side of the converter, each output channel having a secondary control loop, a power valve, and an output channel monitoring device, where each output channel monitoring device measures a control current of the respective power valve of each said output channels and provides an electrical analog output signal as a function of the proximity of the control current to an overload situation;
   a primary control loop being provided on the primary side which directly receives said electrical analog output signals from each of said output channel monitoring devices and drives the input switching stage according to the electrical analog output signals; and
   an overload advance warning unit which monitors the electrical analog output signal of each of said output channel monitoring devices, senses the proximity of the respective control current in each output channel to an overload situation, and provides an indicator signal if one of the electrical analog output signals exceeds a threshold value, where said indicator signal is used to control the pulse width of said input switching stage, where said pulse width is either increased or decreased, without disabling operation of said DC/DC converter.

2. A DC/DC converter according to claim 1, wherein each said power valve further comprises a variable inductor.

3. A DC/DC converter according to claim 1, wherein each output channel generates a different output voltage.

4. A DC/DC converter according to claim 1, wherein the input switching stage has a pulse width modulator that is driven by the primary control loop.

5. A DC/DC converter according to claim 1, wherein the primary control loop has a control unit which specifies a lower and/or an upper limiting value for the control of the input switching stage.

6. A method to operate a DC/DC converter having:
   an input switching stage on the primary side and a plurality of output channels on the secondary side of the converter, each output channel having a secondary control loop;
   a primary control loop on the primary side;
   a power valve and an output channel monitoring device for each said output channel; and
   an overload advance warning unit directly connected to each said output channel, the method comprising:
   monitoring the operation of each of said secondary control loops with said output channel monitoring devices;
   directly receiving an electrical analog monitoring device output signal in said primary control loop from each of said output channel monitoring devices, each of said output signals being a function of the proximity of a control current of the respective power valve to an overload condition;
   driving said input switching stage in accordance with said received electrical analog monitoring device output signals;
   measuring the control current for each of said power valves;
   monitoring each of said output channel electrical analog monitoring device output signals by said overload advance warning unit to measure said control current of each of said power valves to determine the proximity of said control current to an advance warning threshold and to determine whether an advance warning threshold has been reached by any of said power valves; and
   providing an indicator signal to said input switching stage if a threshold value has been exceeded, where the indicator signal is used to control the pulse width of said input switching stage without disabling the operation of said DC/DC converter.

7. A method according to claim 6, wherein each of the secondary control loops are monitored for a near-overload condition in order to generate an overload warning signal, and that when an overload warning signal occurs in at least one of the output channels, a pulse width modulator circuit on the primary side is driven in such a way that the pulse widths are increased.

8. A method according to claim 7, wherein the pulse width modulator circuit on the primary side is driven in such a way that the pulse widths are decreased as long as no overload warning signal is recorded.

9. A method according to claim 6, wherein a pulse width modulator circuit on the primary side is driven such that the pulse widths do not fall below a predetermined minimum value and do not exceed a predetermined maximum value.

10. A method for operating a DC/DC converter including an input switching stage on the primary side and a plurality of output channels on the secondary side of the converter, each output channel having a secondary control loop, a primary control loop on the primary side, a power valve and an output channel monitoring device for each said output channel, and an overload advance warning unit directly connected to each said output channel, the method comprising:
    monitoring the operation of each of the secondary control loops with said output channel monitoring devices;

directly receiving an electrical analog output signal in said primary control loop from each of said output channel monitoring devices;

driving said input switching stage as a function of said received electrical analog output signal;

monitoring each of said electrical analog output signals by said overload advance warning unit to determine the proximity of a control current of each said power valves for said respective output channel to an advance warning threshold; and controlling the pulse width of said input switching stage as a function of the proximity of said output channel to said threshold, wherein each of said electrical analog output signals is a function of the proximity the respective channel to an overload condition of the respective power valve.

11. The method of claim 10 further comprising the step of providing an indicator signal to said input switching stage if one of the electrical analog output signals exceeds a threshold value.

12. The method of claim 10 wherein the step of controlling the pulse width further comprises increasing the pulse width according to a defined rate of increase.

13. The method of claim 10 wherein the step of controlling the pulse width further comprises decreasing the pulse width according to a defined rate of decrease.

14. The method of claim 10 wherein the level of a threshold for an output channel is a function of the output voltage of the respective output channel.

15. The method of claim 10 wherein the step of controlling the pulse width further comprises controlling the pulse width within a predetermined range.

* * * * *